US012767144B2

(12) United States Patent
Goossens et al.

(10) Patent No.: US 12,767,144 B2
(45) Date of Patent: Oct. 20, 2026

(54) CONTROL OF TRANSMISSION WITH ACTIVATED POWER TAKE-OFF

(71) Applicant: DANA BELGIUM, Bruges (BE)

(72) Inventors: Stijn Goossens, Erpe-Mere (BE); Peter Deckmyn, Koekelare (BE); Nicolas Lenaerts, Bruges (BE)

(73) Assignee: DANA BELGIUM, Bruges (BE)

( * ) Notice: Subject to any disclaimer, the term of this patent is extended or adjusted under 35 U.S.C. 154(b) by 97 days.

(21) Appl. No.: 18/639,161

(22) Filed: Apr. 18, 2024

(65) Prior Publication Data

US 2025/0050889 A1 Feb. 13, 2025

Related U.S. Application Data

(60) Provisional application No. 63/518,316, filed on Aug. 8, 2023.

(51) Int. Cl.

| | |
|---|---|
| ***B60W 10/08*** | (2006.01) |
| ***B60W 10/10*** | (2012.01) |
| ***B60W 10/30*** | (2006.01) |
| ***B60W 30/14*** | (2006.01) |
| ***B60W 30/188*** | (2012.01) |

(52) U.S. Cl.

CPC .......... *B60W 30/188* (2013.01); *B60W 10/08* (2013.01); *B60W 10/10* (2013.01); *B60W 10/30* (2013.01); *B60W 30/143* (2013.01); *B60W 2510/083* (2013.01); *B60W 2520/10* (2013.01); *B60W 2540/10* (2013.01); *B60W 2710/1038* (2013.01); *B60W 2710/305* (2013.01); *B60W 2720/10* (2013.01); *B60W 2720/30* (2013.01)

(58) Field of Classification Search

CPC .... B60W 30/188; B60W 10/08; B60W 10/30; B60W 2710/083; B60W 2510/081

See application file for complete search history.

(56) References Cited

U.S. PATENT DOCUMENTS

| | | | | |
|---|---|---|---|---|
| 11,014,549 | B1 * | 5/2021 | Bonny | B60W 10/08 |
| 2006/0252597 | A1 * | 11/2006 | Williams | F16H 61/66 477/107 |
| 2012/0083173 | A1 * | 4/2012 | McMillan | B63H 21/20 903/930 |
| 2014/0187381 | A1 * | 7/2014 | Dix | F16H 61/438 477/94 |
| 2021/0018072 | A1 | 1/2021 | Steinberger et al. | |
| 2021/0364065 | A1 * | 11/2021 | Van Dingenen | B60K 6/365 |
| 2022/0251936 | A1 * | 8/2022 | Wilson | F04B 17/03 |
| 2023/0018536 | A1 * | 1/2023 | Viitasalo | B60K 17/28 |
| 2023/0174043 | A1 | 6/2023 | Goossens et al. | |

(Continued)

FOREIGN PATENT DOCUMENTS

| | | | | |
|---|---|---|---|---|
| DE | 102021115735 A1 * | 1/2022 | | B60K 17/10 |
| EP | 1663687 B1 | 4/2012 | | |

(Continued)

*Primary Examiner* — Stacey A Fluhart

(74) *Attorney, Agent, or Firm* — McCoy Russell LLP

(57) ABSTRACT

A method and system for operating a powertrain that includes a transmission with two power take-off outputs and transmission output shaft is described. In one example, the powertrain is operated in a speed control mode whereby vehicle speed is controlled so that powertrain control may be simplified when a vehicle is moving and a power take-off is supplying power to an external device.

12 Claims, 6 Drawing Sheets

(56) References Cited

U.S. PATENT DOCUMENTS

| | | | | |
|---|---|---|---|---|
| 2023/0174051 | A1 | 6/2023 | Goossens et al. | |
| 2024/0262206 | A1* | 8/2024 | Hosozawa | B60L 1/00 |
| 2024/0300326 | A1* | 9/2024 | Morselli | F16H 37/0813 |

FOREIGN PATENT DOCUMENTS

| | | | | |
|---|---|---|---|---|
| EP | 2949497 | A1 * | 12/2015 | B60K 17/28 |
| WO | WO-2019110259 | A2 * | 6/2019 | B60W 30/188 |

* cited by examiner

CONTROL OF TRANSMISSION WITH ACTIVATED POWER TAKE-OFF

CROSS REFERENCE TO RELATED APPLICATION

The present application claims priority to U.S. Provisional Application No. 63/518,316, entitled "CONTROL OF TRANSMISSION WITH ACTIVATED POWER TAKE-OFF", and filed on Aug. 8, 2023. The entire contents of the above-listed application are hereby incorporated by reference for all purposes.

TECHNICAL FIELD

The present disclosure relates to a transmission that includes power take-off ports for driving loads that may be coupled directly to a vehicle powertrain via gears. The loads may include loads that are driven while the vehicle is traveling.

BACKGROUND AND SUMMARY

A vehicle may include a transmission that includes an output shaft that is coupled to vehicle wheels and a power take-off that is coupled to an output shaft of the transmission via a planetary gear set. The power take-off may transfer torque from an internal combustion engine, or other power source (e.g., an electric machine, fuel cell, etc.), to a device that is coupled to a transmission but does not aid in motion of the vehicle. For example, the power take-off may provide mechanical power to a pump that supplies pressurized fluid to a pump in a hydraulic circuit. The power take-off may rotate at a requested speed when the vehicle is stationary and not traveling on a road with its wheels rotating. The requested speed may be based on the device that is coupled to the power take-off. However, if the vehicle is traveling on a road with its wheels rotating, the power take-off may be deactivated (e.g., adjusted to zero rotational speed) because maintaining a requested wheel torque may be difficult when load on the power take-off changes. For example, because torque at the transmission output shaft and torque at the power take-off output are coupled, it may be possible to provide torque to the transmission output shaft or the power take-off in an unintended rotational direction and/or at an unintended rate of speed change. Further, driving while the wheels and power take-off are engaged may lead to a vehicle's human driver having to learn unnatural driving behaviors to operate the vehicle in an intended way. While it may be possible to dynamically estimate torque that is delivered to the power take-off and the vehicle's wheels, or to estimate torque at an input shaft of the transmission and a power take-off that is coupled to the input shaft of the transmission, generating these estimates may be financial prohibitive. In addition, the system complexity may be greater and there may be greater possibility of sensor degradation. Therefore, it may be desirable to provide a way of controlling a power take-off output and transmission shaft output in a way that reduces the possibility of unintended directional rotation without having to accurately estimate torque at the transmission output shaft and the power take-off.

The inventors herein have recognized the above-mentioned issues and have developed a powertrain, comprising: a transmission including a power take-off and an output shaft that delivers torque to vehicle wheels, where the power take-off is coupled to the output shaft via a planetary gear set; and a controller including executable instructions that cause the controller to operate the powertrain in a first speed control mode where a speed of the output shaft is controlled via the controller in response to a vehicle that includes the powertrain traveling with rotating wheels while delivering power to the power take-off.

By operating the powertrain in a speed control mode where vehicle speed is controlled while a vehicle is moving and a power take-off of the vehicle is activated, it may be possible to avoid unintended movement of the vehicle and operate the power take-off device. Further, it may be possible to avoid additional financial expenses of estimating torque at various locations along the powertrain. In particular, since a speed controller uses feedback of vehicle speed instead of an estimated torque at a particular location along the driveline, the vehicle may be controlled with a readily available speed feedback signal without having to estimate torque at the transmission output shaft and at the power take-off.

The present description may provide several advantages. In particular, the approach may increase powertrain functionality by allowing a vehicle that includes a second power take-off to operate in a desired way when a vehicle is moving. In addition, the approach may reduce a possibility of a vehicle traveling in an unintended direction and unintended rates of speed change for a vehicle. Further, the approach may allow a vehicle operator to operate the vehicle in a natural or expected way.

It may be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not constrained to implementations that solve any disadvantages noted above or in any part of this disclosure.

The accompanying drawings are incorporated herein as part of the specification. The drawings described herein illustrate embodiments of the presently disclosed subject matter, and are illustrative of selected principles and teachings of the present disclosure. However, the drawings do not illustrate all possible implementations of the presently disclosed subject matter, and are not intended to constrain the scope of the present disclosure in any way.

DETAILED DESCRIPTION

Figure 1:
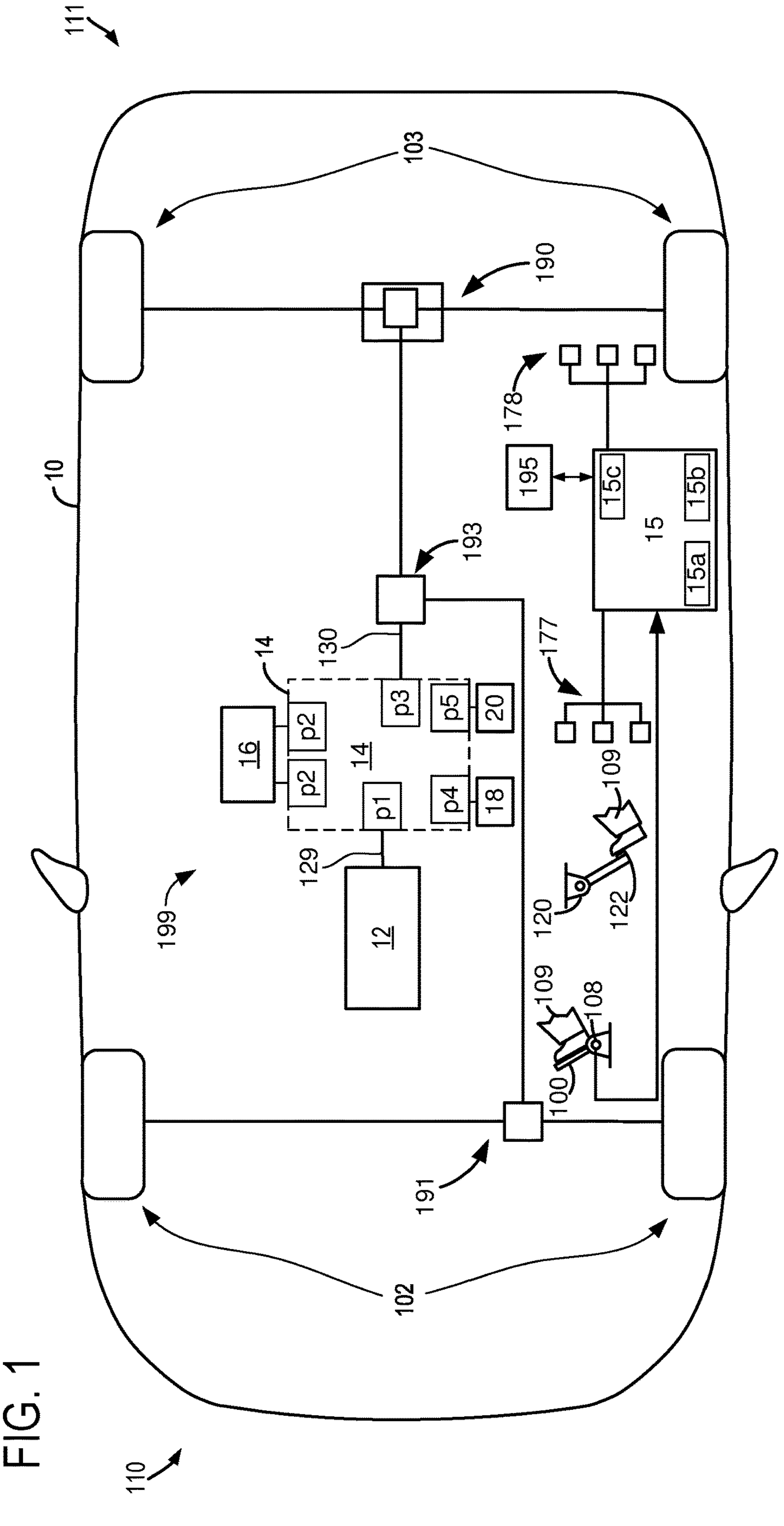
FIG. 1 is a schematic diagram of an example vehicle powertrain that includes a transmission.
Figure 2:
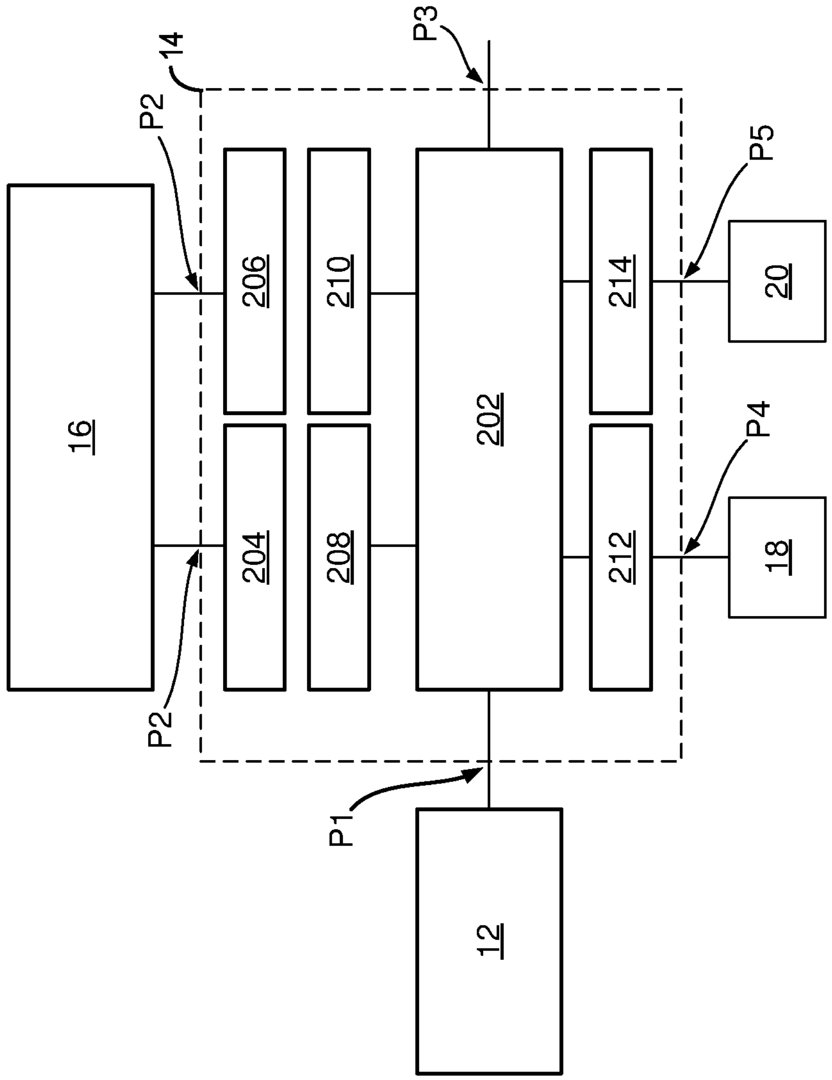
FIG. 2 a block diagram of an example transmission.
Figure 3:
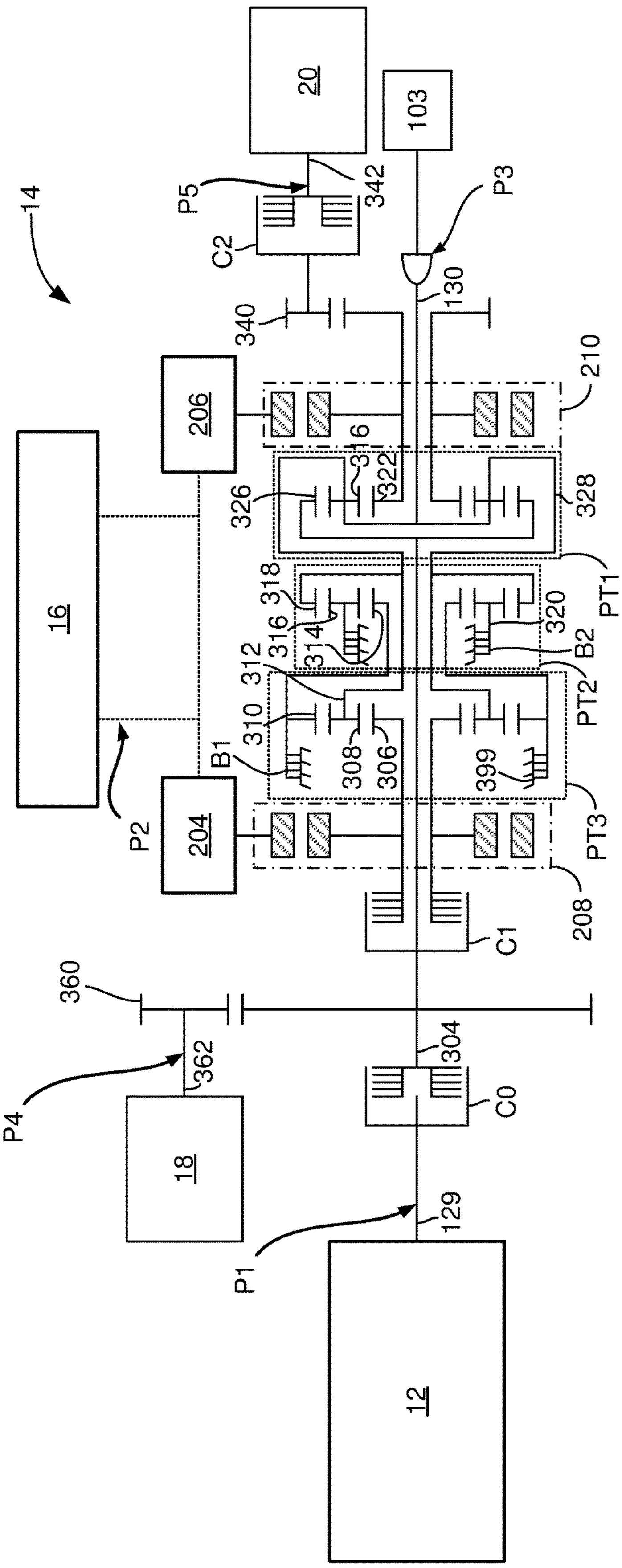
FIG. 3 shows a detailed schematic of a transmission.
Figure 4:
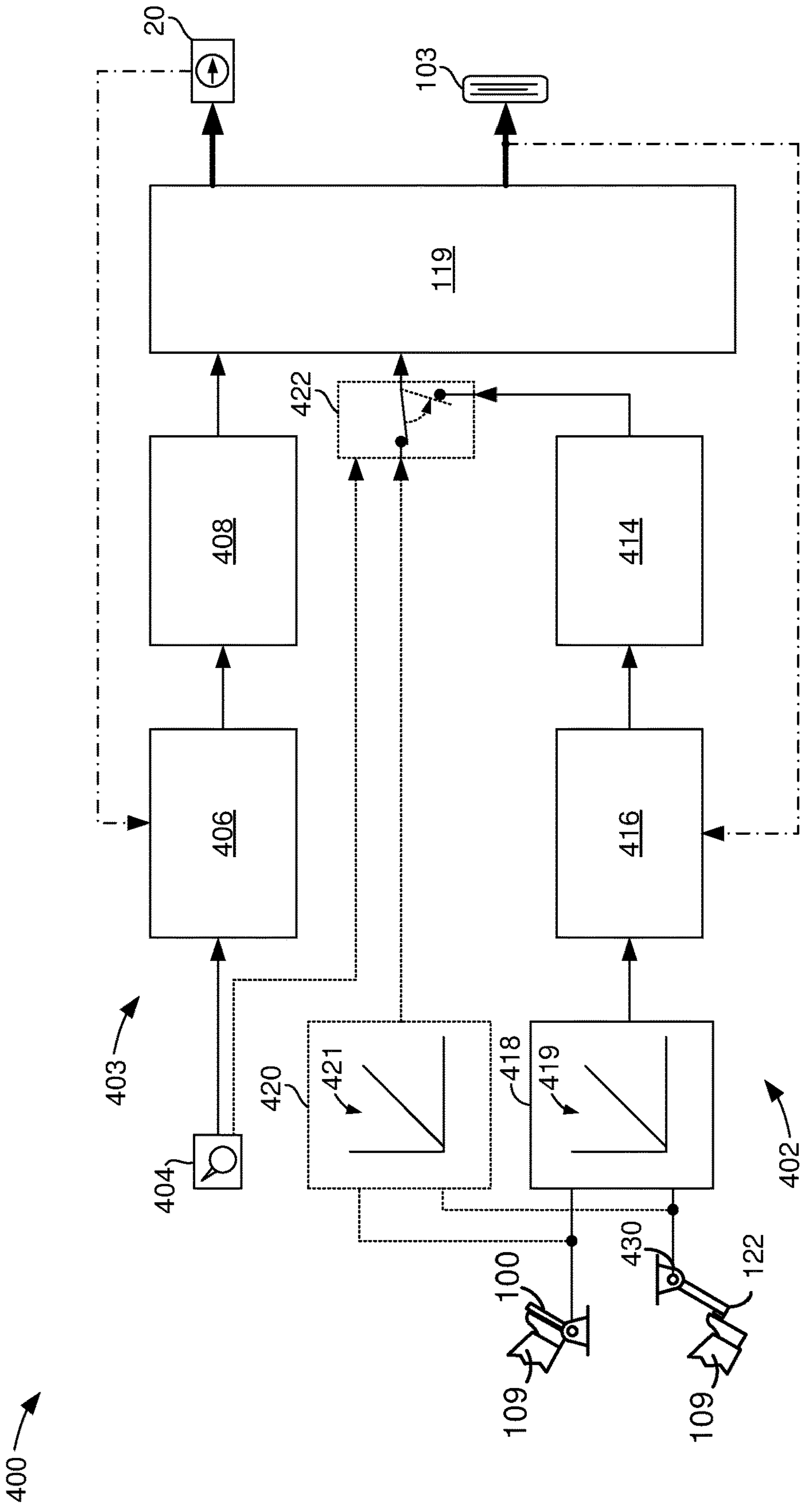
FIG. 4 shows a block diagram for operating a vehicle and transmission in speed control mode.
Figure 5:
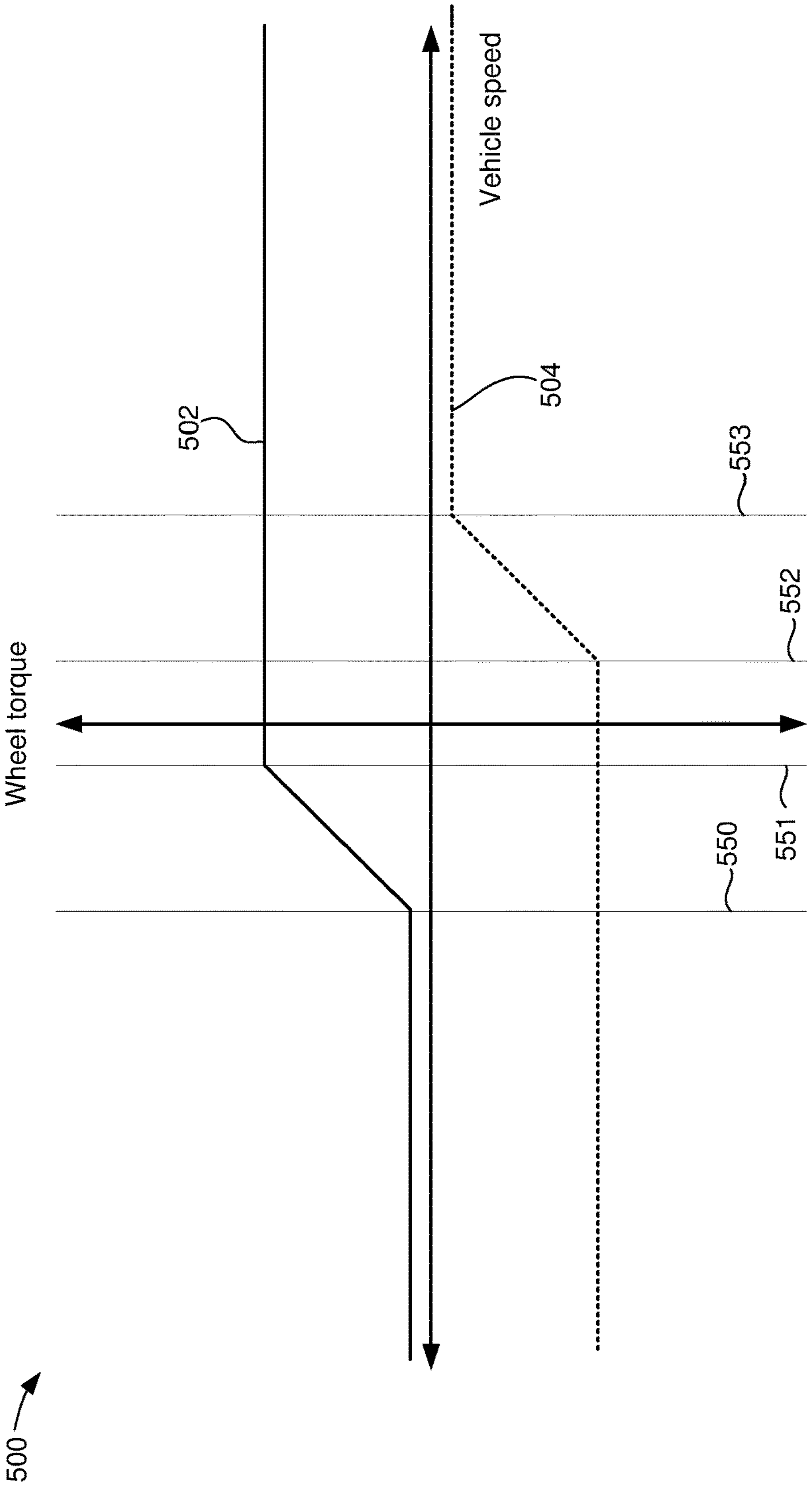
FIG. 5 shows an allowable torque range when operating a vehicle in speed control mode while a second power take-off is activated.
Figure 6:
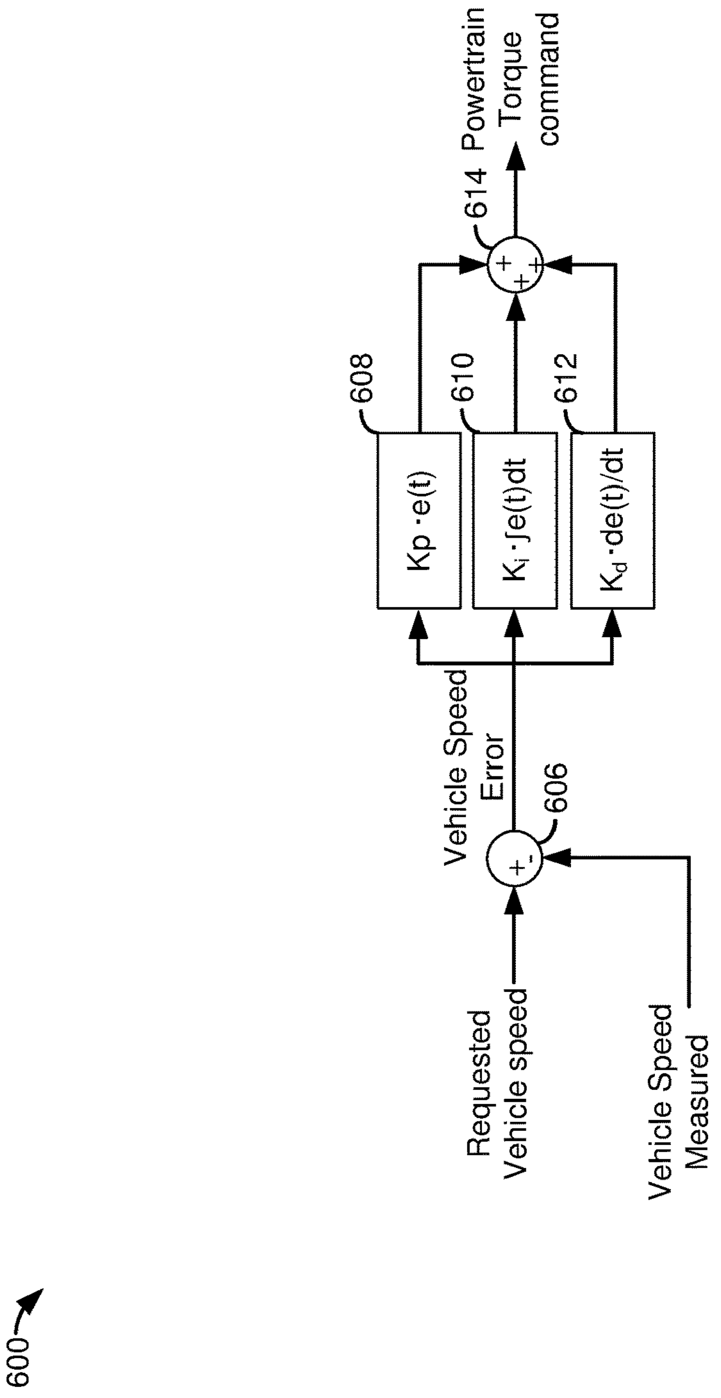
FIG. 6 shows an example proportional/integral/derivative controller for operating a vehicle in a speed control mode.

The following description relates to systems and methods for operating a moving vehicle that includes a power take-off device to drive external loads. The vehicle may include a transmission with two power take-off ports that may be driven via an external power source or via an electric machine that is included in the transmission. The transmission may be included in a two or four wheel drive vehicle as shown in FIG. 1. The transmission may be configured as shown in FIG. 2, and the transmission may include the components that are shown in FIG. 3. The transmission may be operated according to the control block diagram that is shown in the block diagram of FIG. 4. The transmission controller may constrain wheel torque between two thresholds as shown in FIG. 5. In one example, the controller may be a proportional/integral/derivative (PID) controller as shown in FIG. 6.

FIG. 1 illustrates an example vehicle powertrain 199 included in vehicle 10. Vehicle 10 includes a front side 110 and a rear side 111. Vehicle 10 includes front wheels 102 and rear wheels 103. Vehicle 10 includes a propulsion source 12 (e.g., internal combustion engine or electric machine) that may selectively provide propulsive effort to front axle 191 and rear axle 190. In other examples, the propulsion source 12 may provide propulsive effort solely to front axle 191 or solely to rear axle 190. Propulsion source 12 is shown mechanically coupled to transmission 14 via transmission input shaft 129. In some examples, the engine's crankshaft (not shown) may be coupled to transmission input shaft 129. Transfer case 193 routes mechanical power from transmission output shaft 130 to front axle 191 and rear axle 190.

Electric energy storage device 16 (e.g., a traction battery or capacitor) may provide electric power to electric machines included in transmission 14. Transmission 14 may supply mechanical power to mechanically driven accessories 18 and 20. Transmission 14 may be operated via controller 15. In this example, controller 15 is configured to command electric machines (not shown), clutches (not shown), and brakes (not shown) within transmission 14. Controller 15 may switch operating modes of transmission 14 via adjusting states of clutches and brakes as indicated in FIG. 4. Controller 15 may also receive a position of a driver demand pedal 100 from driver demand pedal position sensor 108, which may be an input for determining the operating state of transmission 14. The driver demand pedal 100 and the driver demand pedal position sensor 108 may react to movement caused by human driver 109. Brake pedal 122 may be applied by human driver 109 and brake pedal sensor 120 provides an indication of brake pedal position to controller 15. Controller 15 may receive data from sensors 177. Sensors 177 may include, but are not constrained to a vehicle speed sensor, a transmission temperature sensor, transmission input shaft speed sensor, transmission output shaft speed sensor, wheel speed sensors, and an ambient temperature sensor. Controller 15 may adjust operating states of the vehicle powertrain 199 via adjusting operating states of actuators 178. Actuators 178 may include but are not constrained to electric machines, inverters, clutches (C0-C2), brakes (B1/B2), and engine torque actuators (throttle, cams, fuel injectors, spark actuator). Controller 15 includes a processor 15*a* for executing instructions, read-only memory 15*b*, and random access memory 15*c*. In this example, a single controller 15 is shown, but in other examples several controllers may operate together in a distributed system to perform the methods described herein. Controller 15 may receive input from and provide output to human/machine interface 195 (e.g., touch screen display, pushbuttons, etc.).

Referring now to FIG. 2, a block diagram of transmission 14 is shown. Transmission 14 is shown with 5 ports that are labeled P1-P5. Port 1 (P1) is configured to receive mechanical energy from propulsion source 12 (e.g., internal combustion engine or electric machine). Alternatively, port 1 may deliver mechanical energy to external power source 12. Port 2 (P2) is a port that receives electrical power from electric energy storage device 16. Alternatively, port 2 may provide electrical power to electric energy storage device 1. Electrical ports 2 are shown directly electrically coupled to a first inverter 206 and a second inverter 204. First inverter 206 may convert direct current (DC) to alternating current (AC). AC may be delivered from first inverter 206 to first electric machine 210. Likewise, AC may be delivered from second inverter 204 to second electric machine 208. Alternatively, first and second electric machines 210 and 208 may deliver AC power to inverters 206 and 204. Electric machines 210 and 208 may supply mechanical power to gears, clutches, and brakes 202. As such, electric machines 210 and 208 may also be referred to as propulsion sources. Gears, clutches, and brakes 202 may transfer mechanical power to output ports P3-P5. Output port P3 may transfer mechanical power to wheels 103. Output port P4 may transfer mechanical power to power take-off (PTO 1) 212 and accessories 18, the accessories 18 not including vehicle wheels. Output port P5 may transfer mechanical power to power take-off (PTO 2) 214 and accessories 20, the accessories 20 not including vehicle wheels.

Turning now to FIG. 3, a detailed view of one example of transmission 14 is shown. In this example, propulsion source 12 is shown coupled to transmission input shaft 129. Transmission input shaft 129 is coupled to clutch C0 and clutch C0 may selectively couple transmission input shaft 129 to connecting shaft 304. Clutch C0 is directly coupled to ring gear 326 of first planetary gear set PT1 and PTO 1 gear 360 via connecting shaft 304. PTO 1 gear 360 may be coupled to accessories 18 via PTO 1 shaft 362. First planetary gear set PT1 also includes planetary gears 316 and a sun gear 322. Sun gear 322 is shown coupled to PTO 2 gear 340 and electric machine 210. Planetary gears 316 couple sun gear 322 to ring gear 326. Carrier 328 supports planetary gears 316. PTO 2 gear 340 may be selectively coupled to PTO 2 output shaft 342 via PTO 2 clutch C2. PTO 2 output shaft 342 may be directly coupled to accessories 20, and accessories 20 are not coupled to vehicle wheels.

Connecting shaft 304 may be selectively coupled to electric machine 208 and sun gear 306 of third planetary gear set PT3 via closing input coupled clutch C1. Sun gear 306 of third planetary gear set PT3 is coupled to planetary gears 308. Planetary gears 308 are coupled to ring gear 310, and planetary gears 308 are supported via carrier 312. Planetary gears 308 are coupled to ring gear 318 of second planetary gear set PT2 and planetary gears 316 of first planetary gear set PT1 via carrier 312 of third planetary gear set PT3 and carrier 328 of first planetary gear set PT1. Carrier 328 of first planetary gear set PT1 is coupled to wheels 103 via transmission output shaft 130. Brake B1 may be closed to ground or couple ring gear 310 of third planetary gear set PT3 to transmission housing 399.

Second planetary gear set PT2 includes a sun gear 314 that is coupled to ring gear 310 of first planetary gear set PT1. Planetary gears 308 of second planetary gear set PT2 are coupled to sun gear 314 of planetary gear set PT2 and ring gear 318 of second planetary gear set PT2. Brake B2 may be closed to ground or couple carrier 320 of second planetary gear set PT2 to transmission housing 399.

PTO 1 is directly coupled to connecting shaft 304. Therefore, whenever connecting shaft 304 is rotating, PTO 1 output shaft 362 rotates. PTO 1 output shaft 362 may be rotated via closing clutch C0 when propulsion source 12 is rotating. PTO 1 may also be rotated via electric machine 208 by closing clutch C1. PTO 1 may rotate in any of the modes that are shown in the table of FIG. 4.

PTO 2 may rotate and provide mechanical power to accessories 20 during three modes as indicated in FIG. 4. In a hill hold mode, brakes B1 and B2 may be closed to lock rotation of transmission output shaft 130 and PTO 2 output shaft 342 may be rotated via torque generated via electric machine 210 and/or propulsion source 12. In this way, PTO 2 output shaft 342 may rotate at a speed that is a multiple of a rotational speed of propulsion source 12 and connecting shaft 304.

PTO 2 output shaft 342 may be rotated when clutch C1 is open, C2 is closed, and C0 is open or closed. PTO 2 output shaft 342 may also provide mechanical torque to accessories 20 when brake B1 is open, B2 is closed, C1 is open, C2 is closed and C0 is open or closed. Applying brake B2 prevents rotation of carrier 320 so that when propulsion source 12 or electric machine 208 drive the transmission output shaft 130 via connecting shaft 304, second planetary gear set PT2, and first planetary gear set PT1, PTO 2 gear 340 may rotate. Energy may flow from propulsion source 12 to connecting shaft 304 via clutch C0, connecting shaft 304 may transfer torque to ring gear 326 causing planetary gears 316 to rotate along with sun gear 322 so that carrier 328 and transmission output shaft 130 may rotate. Rotating sun gear 322 allows PTO 2 gear 340 to rotate. PTO2 output shaft 342 may rotate when clutch C2 is closed.

PTO 2 output shaft 342 may also be rotated when clutch C1 is open, C2 is closed, and C0 is open or closed. PTO 2 output shaft 342 may also provide mechanical torque to accessories 20 when brake B1 is closed, B2 is open, C1 is open, C2 is closed and C0 is open or closed. Applying brake B1 prevents rotation of ring gear 310 and sun gear 306. Energy may flow from propulsion source 12 to connecting shaft 304 via clutch C0, connecting shaft 304 may transfer torque to ring gear 326 causing planetary gears 316 to rotate along with sun gear 322 so that carrier 328 and transmission output shaft 130 may rotate. Rotating sun gear 322 allows PTO 2 gear 340 to rotate. PTO2 output shaft 342 may rotate when clutch C2 is closed.

Thus the system of FIGS. 1-3 may provide for a powertrain, comprising: a transmission including a power take-off and an output shaft that delivers torque to vehicle wheels, where the power take-off is coupled to the output shaft via a planetary gear set; and a controller including executable instructions that cause the controller to operate the powertrain in a first speed control mode where a speed of the output shaft is controlled via the controller in response to a vehicle that includes the powertrain traveling with rotating wheels while delivering power to the power take-off. In a first example, the powertrain further comprises operating the power take-off in a second speed control mode while operating the powertrain in the first speed control mode. In a second example that may include the first example, the powertrain includes where a first speed controller of the controller controls the output shaft speed, and where a second speed controller of the controller controls the power take-off. In a third example that may include one or more of the first and second examples, the powertrain includes where the first speed controller controls the output shaft to a first speed, where the second speed controller controls the power take-off speed to a second speed, and where the second speed is different than the first speed. In a fourth example that may include one or more of the first through third examples, the powertrain includes where the first speed controller adjusts torque of a propulsion source in response to a difference between a requested vehicle speed and an actual vehicle speed. In a fifth example that may include one or more of the first through fourth examples, the powertrain includes where the requested vehicle speed is based on a position of a driver demand pedal. In a sixth example that may include one or more of the first through fifth examples, the powertrain includes where the second speed controller adjusts torque of an electric machine in response to a difference between a requested power take-off speed and an actual power take-off speed.

Thus, the system of FIGS. 1-3 also provides for a powertrain, comprising: a transmission including a first power take-off port including a power take-off shaft that rotates at a multiple of a rotational rate of a first shaft, the first shaft coupled to a ring gear of first planetary gear set, a second shaft configured to deliver power to vehicle wheels, the second shaft coupled to carrier planetary gears of the first planetary gear set; and a second power take-off port, the second power take-off port coupled to a sun gear of the first planetary gear set, the first power take-off port and the second power take-off port not configured to be coupled to the second shaft, except via the first planetary gear set; and a controller including executable instructions that cause the controller to operate the powertrain in a speed control mode in response to a vehicle that includes the powertrain traveling with rotating wheels while delivering power to the second power take-off port. In a first example, the powertrain includes where the speed control mode includes controlling a vehicle speed, and further comprising: additional instructions to control the vehicle speed via vehicle speed feedback. In a second example that may include the first example, the powertrain further comprises additional instructions to control the vehicle speed in response to a requested vehicle speed, and where the requested vehicle speed is based on a position of a driver demand pedal. In a third example that may include one or both of the first and second examples, the powertrain further comprises additional instructions to control a speed of a shaft of the second power take-off port. In a four example that may include one or more of the first through third examples, the powertrain further comprises additional instructions to confine wheel torque output to be between a first threshold wheel torque and a second threshold wheel torque.

Referring now to FIG. 4, an example block diagram 400 of a vehicle speed controller 402 and a power take-off speed controller 403 for a second power take-off (P5 of FIG. 1) for the powertrain 199 of FIG. 1 is shown. The vehicle speed controller 402 and the power take-off speed controller 403 may be included in controller 15 of FIG. 1 as executable instructions stored in non-transitory memory. Further, block diagram 400 in cooperation with the system of FIGS. 1-3 may include taking actions taken in the physical world to transform an operating state of the system of FIGS. 1-3 via adjusting positions of the various actuators.

The vehicle speed controller 402 may receive input via a driver demand pedal 100 and a brake pedal. The driver demand pedal position and the brake pedal position are input to block 418. Block 418 converts the brake pedal position and driver demand pedal position in a requested vehicle speed. In one example, block 418 may include a function or table 419 that is referenced or indexed via driver demand pedal position and brake pedal position. The function or table outputs an empirically determined requested vehicle speed. The requested vehicle speed values may be determined via applying the driver demand pedal and brake pedal and adjusting the requested vehicle speed until vehicle performance objectives are met. The requested vehicle speed is input to block 416.

Block 416 represents a vehicle speed controller. In one example, the vehicle speed controller is a proportional/integral/derivative (PID) controller as described in FIG. 6. Alternatively, the vehicle speed controller may be a linear quadratic controller or other known type of controller. Block 416 outputs a requested wheel torque to block 414. The controller of block 416 may receive vehicle speed feedback and adjust the requested wheel torque according to a vehicle speed error that is a difference between the requested vehicle speed and the actual vehicle speed. The controller of block 416 may adjust actual vehicle speed to follow a requested vehicle speed that is a function of wheel speed via adjusting wheel torque, such that wheel torque is allowed to vary so that the actual vehicle speed meets the requested vehicle speed. In this way, powertrain 119 is operated in a speed control mode.

At block 414, the requested wheel torque may be constrained to be within an upper torque threshold and a lower torque threshold via a filter as shown in FIG. 5. The output of block 414 is a filtered requested wheel torque and the powertrain 119 may be commanded to the filtered requested wheel torque. The powertrain 119 may respond to the filtered requested wheel torque via generating wheel torque via a propulsion source of the powertrain 119. The wheel speed which may indicate vehicle speed is fed back to block 416 where it is applied to correct the requested wheel torque.

Blocks 420 and 422 are optional as indicated by the dashed lines. If block 420 is present, it receives input of driver demand pedal position and brake pedal position. A table or function 421 may be referenced or indexed via driver demand pedal position and brake pedal position. The table or function 421 outputs a requested wheel torque and the requested wheel torque is input to block 422.

If block 422 is present, the powertrain 119 may be operated in torque control mode or in vehicle speed control mode. If human driver 109 requests operation of PTO 2 and the vehicle is traveling with its wheels rotating, block 422 may switch such that the filtered wheel torque output from block 414 is commanded of the powertrain 119. On the other hand, if human driver 109 is not requesting operation of PTO 2, block 422 may switch such that requested wheel torque output from block 420 is commanded of the powertrain 119. If block 422 is not present, the filtered requested vehicle speed is directly commanded of the powertrain 119. Additionally, if block 422 is not present, the vehicle may operate solely in vehicle speed control mode. Powertrain 119 may adjust torque output of one or more propulsion sources (e.g., electric machine or internal combustion engine) to generate the torque that produces the requested vehicle speed, wheel torque, and PTO speed.

In addition to vehicle speed controller 402, a speed controller 403 for PTO 2 is included to control the rotational speed of PTO 2. Human driver 109 may request a rotational speed for PTO 2 via human/machine interface 404. The human/machine interface may output a requested rotational speed for PTO 2 to block 406.

Block 406 represents a PTO rotational speed controller for PTO 2. In one example, the vehicle speed controller is a proportional/integral/derivative (PID) controller similar to the speed controller that is described in FIG. 6. Alternatively, the PTO rotational speed controller may be a linear quadratic controller or other known type of controller. Block 406 outputs a requested rotational PTO speed (e.g., a PTO that has been requested via a human operator or via a controller) to block 408. The controller of block 406 may receive rotational speed feedback from PTO 2 and adjust the requested PTO 2 torque according to a PTO 2 rotational speed error that is a difference between the requested rotational PTO 2 speed and the actual rotational PTO 2 speed. The controller of block 506 may adjust actual rotational PTO 2 speed to follow a requested rotational PTO 2 speed via adjusting a PTO 2 torque command, such that PTO 2 torque is allowed to vary so that the actual rotational PTO 2 speed meets the requested rotational PTO 2 speed. In this way, powertrain 119 may operate PTO 2 in a rotational speed control mode.

At block 408, the requested rotational PTO 2 speed may be constrained to be within an upper torque threshold and a lower torque threshold via a filter. The output of block 408 is a filtered requested rotational PTO 2 speed and the powertrain 119 may be commanded to the filtered requested rotational PTO 2 speed. The powertrain 119 may respond to the filtered requested rotational PTO 2 speed via generating PTO 2 via a propulsion source of the powertrain 119. The rotational PTO 2 speed is fed back to block 406 where it is applied to correct the requested rotational PTO 2 speed. The filtered requested rotational PTO 2 speed is commanded of the powertrain 119. Powertrain 119 may rotate accessories 20 (e.g., a pump) at the requested rotational PTO 2 speed.

Thus, the control block diagram of FIG. 4 provides for a method for operating a powertrain, comprising: operating the powertrain in a speed control mode where a speed of a vehicle speed is controlled to a requested vehicle speed via a controller and in response to a power take-off supplying power to a device external to a transmission and a vehicle that includes the transmission traveling with rotating wheels. In a first example, the method for operating the powertrain includes where the speed control mode includes adjusting the speed of the vehicle to the requested vehicle speed while torque supplied via the powertrain is varied. In a second example that may include the first example, the method for operating the powertrain further comprises torque supplied via the powertrain in response to a difference between the requested vehicle speed and the vehicle speed. In a third method that may include one or more of the first and second methods, the method for operating the powertrain includes where the controller is a proportional, integral, derivative controller. In a fourth method that may include one or more of the first through third methods, the method for operating the powertrain further comprises operating the power take-off in a speed control mode via a second controller. In a fifth method that may include one or more of the first through fourth methods, the method for operating the powertrain includes where the second controller is a proportional, integral, derivative controller. In a sixth method that may include one or more of the first through fifth methods, the method for operating the powertrain includes where operating the powertrain in the speed control mode includes adjusting a wheel torque output of the powertrain, and further comprising: confining the wheel torque output to be between a first threshold torque and a second threshold torque. In a seventh method that may include one or more of the first through sixth methods, the method for operating the powertrain includes where the first threshold torque and the second threshold torque vary with the vehicle speed.

In another representation, the method of FIG. 4 provides for a method for operating a powertrain, comprising: operating the powertrain in a speed control mode where a speed of a vehicle speed is controlled to a requested vehicle speed via a controller and in response to a power take-off supplying power to a device external to a transmission and a vehicle that includes the transmission traveling with rotating wheels; and not operating the powertrain in the speed control mode and operating the powertrain in a torque control mode in response to the power take-off not supplying power to the device external to the transmission and the vehicle that includes the transmission traveling with rotating wheels. In torque control mode, torque of the vehicle (e.g., wheel torque) is adjusted to follow a target or requested torque and vehicle speed is allowed to vary. In speed control mode, vehicle speed is adjusted to follow a target or requested vehicle speed and vehicle torque (e.g., wheel torque) is allowed to vary.

Referring now to FIG. 5, a plot that shows an allowable torque range for a powertrain that is operating with PTO 2 active (e.g., rotating and providing torque to an external accessory and not the vehicle's wheels) in a vehicle that is traveling with its wheels rolling is presented. The horizontal axis represents vehicle speed and vehicle speed increases in the direction to the right of the vertical axis. Vehicle speed magnitude increases in the direction to the left of the vertical axis. The vertical axis represents wheel torque and wheel torque is positive and increasing in the direction of the vertical axis arrow above the horizontal axis. Wheel is negative below the horizontal line and the magnitude of negative wheel increases in the direction of the vertical axis arrow that is below the horizontal line.

Solid line 502 represents an upper torque threshold that is not to be exceeded by wheel torque when operating the powertrain with PTO 2 active and the vehicle traveling with its wheels rotating. Dashed line 504 represents a negative torque threshold with a magnitude that is not to be exceeded by wheel torque when operating the powertrain with PTO 2 active and the vehicle traveling with its wheels rotating. Thus, the allowable range for wheel torque is between threshold 502 and threshold 504. The commanded or final wheel torque may vary between the thresholds (502 and 504), but its magnitude is constrained not to be in the area that is above threshold 502 and constrained not to be in the area that is below threshold 504.

The vehicle speeds between vertical line 550 and vertical line 551 represent a range where wheel torque increases as a magnitude of negative vehicle speed (e.g., travel in reverse) decreases. The vehicle speeds between vertical line 552 and vertical line 553 represent a range where wheel torque decreases as a magnitude of positive vehicle speed (e.g., travel in a forward direction) increases.

Thus, it may be observed that for lower vehicle speeds, larger amounts of wheel torque may be generated via the powertrain in forward (positive) and reverse (negative) directions. This allows for a low requested vehicle speed (e.g., zero) via adjusting vehicle brakes while PTO 2 is active. At higher vehicle speeds, regenerative braking torque is constrained to a small value such that when actual vehicle speed is greater than the requested vehicle speed, the vehicle coasts (e.g., moves without sending powertrain torque to the wheels).

Turning now to FIG. 6, a block diagram 600 of an example PID controller is shown. The PID controller of FIG. 6 may be applied as a vehicle speed controller and/or a PTO speed controller by simply adjusting the signals that are input to the PID controller and directing the output of the PID controller to a proper system or actuator.

At summing junction 606, actual or measured vehicle speed is subtracted from a requested vehicle speed to generate a vehicle speed error. The vehicle speed error is delivered to blocks 608-612. At block 608, a proportional scalar or gain (e.g., a real number) variable $K_p$ is multiplied by the vehicle speed error (e) that is a function of time to generate a proportional component of the PID controller output. Block 608 outputs the proportional component of the PID controller to summing junction 614. At block 610, an integral scalar or gain (e.g., a real number) variable $K_i$ is multiplied by the integral of the vehicle speed error (e) to generate an integral component of the PID controller output. Block 610 outputs the integral component of the PID controller to summing junction 614. At block 612, a derivative scalar or gain (e.g., a real number) variable $K_d$ is multiplied by the derivative of vehicle speed error (e) to generate a derivative component of the PID controller output. Block 612 outputs the proportional component of the PID controller to summing junction 614. The PID control adjustment to generator torque is output from summing junction 614 to the powertrain 119 (not shown).

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for case of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a constrained sense, because numerous variations are possible. For example, the above technology can be applied to powertrains that include different types of propulsion sources including different types of electric machines and transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A powertrain of a vehicle, comprising:

a transmission including a power take-off and an output shaft that delivers torque to vehicle wheels, where the power take-off is coupled to the output shaft via a planetary gear set; and a controller including executable instructions that cause the controller to:

operate the powertrain in a first speed control mode, where in the first speed control mode, an output shaft rotational speed is controlled via the controller in response to the vehicle traveling with rotating wheels while delivering power to the power take-off; and operate the power take-off in a second speed control mode while operating the powertrain in the first speed control mode, wherein a first speed controller of the controller controls the output shaft rotational speed in the first speed control mode, and wherein a second speed controller of the controller controls a power take-off rotational speed in the second speed control mode.

2. The powertrain of claim 1, where the first speed controller controls the output shaft rotational speed to a first rotational speed, where the second speed controller controls the power take-off rotational speed to a second rotational speed, and where the second rotational speed is different than the first rotational speed.

3. The powertrain of claim 2, where the first speed controller adjusts torque of a propulsion source in response to a difference between a requested vehicle speed and an actual vehicle speed.

4. The powertrain of claim 3, where the requested vehicle speed is based on a position of a driver demand pedal.

5. The powertrain of claim 1, where a second speed controller adjusts torque of an electric machine in response to a difference between a requested power take-off speed and an actual power take-off speed.

6. A method for operating a powertrain of a vehicle, the vehicle including a transmission, comprising:

determining that a power take-off is supplying power to a device external to the transmission and that the vehicle is traveling with rotating wheels, and in response, operating the powertrain in a speed control mode where a speed of the vehicle is controlled to a requested vehicle speed via a controller, wherein the speed control mode includes adjusting the speed of the vehicle to the requested vehicle speed while torque supplied via the powertrain is varied, wherein the controller is a proportional, integral, derivative controller;

supplying torque via the powertrain in response to a difference between the requested vehicle speed and the speed of the vehicle; and operating the power take-off in a second speed control mode via a second controller.

7. The method for operating the powertrain of claim 6, where the second controller is a proportional/integral/derivative controller.

8. The method for operating the powertrain of claim 6, where operating the powertrain in the speed control mode includes adjusting a wheel torque output of the powertrain, and further comprising:

confining the wheel torque output to be between a first threshold torque and a second threshold torque.

9. The method for operating the powertrain of claim 8, where the first threshold torque and the second threshold torque vary with the speed of the vehicle.

10. A powertrain for a vehicle, comprising:

a transmission including a first power take-off port including a power take-off shaft that rotates at a multiple of a rotational rate of a first shaft, the first shaft coupled to a ring gear of first planetary gear set, a second shaft configured to deliver power to vehicle wheels, the second shaft coupled to carrier planetary gears of the first planetary gear set; and a second power take-off port, the second power take-off port coupled to a sun gear of the first planetary gear set, the first power take-off port and the second power take-off port not configured to be coupled to the second shaft, except via the first planetary gear set; and a controller including executable instructions that cause the controller to operate the powertrain in a speed control mode in response to the vehicle traveling with rotating wheels while delivering power to the second power take-off port, where the speed control mode includes controlling vehicle speed via vehicle speed feedback, including controlling the vehicle speed in response to a requested vehicle speed, the requested vehicle speed based on a position of a driver demand pedal.

11. The powertrain of claim 10, further comprising additional instructions to control a speed of a shaft of the second power take-off port.

12. The powertrain of claim 10, further comprising additional instructions to confine wheel torque output to be between a first threshold wheel torque and a second threshold wheel torque.

* * * * *